United States Patent
Akutsu (10) Patent No.: US 8,090,248 B2
(45) Date of Patent: Jan. 3, 2012

(54) ANTI-VIBRATION ACTUATOR AND LENS UNIT/CAMERA EQUIPPED THEREWITH

(75) Inventor: Toshinori Akutsu, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 12/644,850

(22) Filed: Dec. 22, 2009

(65) Prior Publication Data
US 2010/0166401 A1   Jul. 1, 2010

(30) Foreign Application Priority Data

Dec. 25, 2008  (JP) ................................. 2008-330620

(51) Int. Cl.
*G03B 17/00* (2006.01)

(52) U.S. Cl. ................. 396/55; 348/208.99; 348/208.11

(58) Field of Classification Search ............... 396/52, 396/55, 144; 359/557; 348/208.11
See application file for complete search history.

(56) References Cited

U.S. PATENT DOCUMENTS

| 6,064,827 A * | 5/2000 | Toyoda | 396/55 |
| 6,400,902 B1 * | 6/2002 | Usui | 396/55 |
| 7,400,824 B2 * | 7/2008 | Seo | 396/55 |
| 7,620,305 B2 | 11/2009 | Noji | |
| 2006/0072913 A1 * | 4/2006 | Noji | 396/55 |
| 2007/0127904 A1 * | 6/2007 | Iwasaki et al. | 396/55 |
| 2007/0127907 A1 * | 6/2007 | Iwasaki et al. | 396/144 |
| 2008/0187301 A1 * | 8/2008 | Takahashi | 396/55 |

FOREIGN PATENT DOCUMENTS

| JP | 2006-106177 A | 4/2006 |
| JP | 2008-122531 A | 5/2008 |

* cited by examiner

*Primary Examiner* — Clayton E Laballe
*Assistant Examiner* — Warren Fenwick
(74) *Attorney, Agent, or Firm* — Jacobson Holman PLLC (57) ABSTRACT

To provide an anti-vibration actuator with which a high drive force can be obtained without increasing size. The present invention is an anti-vibration actuator, including a fixed portion, a movable portion, movable portion support means, first drive means having a first drive magnet and coil; second drive means having a second drive magnet and coil; third drive means having a third drive magnet and coil; first, second, and third position detection elements for detecting the positions of each drive magnet; and a control portion for moving the movable portion to a specified position; wherein the first and second position detection elements are disposed within a region diagonally opposed to the region in which the third drive means is positioned, from among four regions partitioned by the lines of action of the drive forces of the first and second drive means.

14 Claims, 7 Drawing Sheets

ANTI-VIBRATION ACTUATOR AND LENS UNIT/CAMERA EQUIPPED THEREWITH

BACKGROUND OF THE INVENTION

1. Field of the Invention

The present invention relates to an anti-vibration actuator, and in particular to an anti-vibration actuator and lens unit/camera equipped therewith for moving an image stabilizing lens within a plane perpendicular to the optical axis thereof.

2. Description of Related Art Including Information Disclosed Under 37 CFR §§1.97 and 1.98

Figure 11:
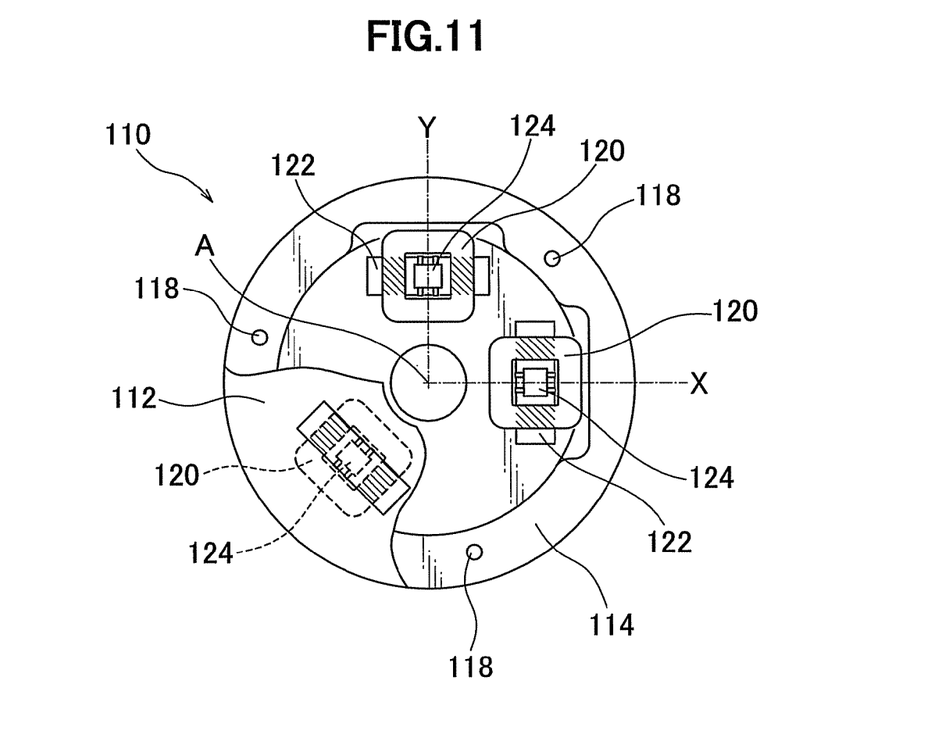
FIG. 11 Front elevation of a conventional actuator

Published Unexamined Application 2006-106177 (Patent Citation 1) describes an actuator. FIG. 11 shows an overview of the structure of this actuator. As shown in FIG. 11, an actuator 110 is furnished with a fixed portion 112 and a movable portion 114; the movable portion 114 is supported by three steel balls 118 so as to be translationally and rotationally movable with respect to the fixed portion 112. The movable portion 114 is driven by three linear motors comprising three sets of drive coils 120 and drive magnets 122.

The lines of action of the drive forces generated by these three actuators are respectively directed in the circumferential direction of a circle centered on the light axis A of the anti-vibration lens. Hall elements 124 for detecting the position of each drive magnet 122 are disposed in mutual opposition within each of the drive coils 120. Regarding two of these Hall elements 124, the detection portion of one is disposed on the X axis, which forms the horizontal axis line passing through optical axis A, while the detection portion of the other disposed is on the Y axis, which is a vertical axial line passing through optical axis A. The remaining Hall element is disposed on the side opposite the other two Hall elements so as to sandwich the optical axis A.

In the actuator 110, rotation of the movable portion 114 is restricted by a guide means or the like, but translational movement of the movable portion 114 is achieved by driving with the three linear motors in coordination. Moreover, rotational movement of the movable portion is enabled by control of the three linear motors.

Thus an actuator not furnished with a guide means for restricting rotation of the movable portion allows for a simple mechanism to support the movable portion, and has the advantage of allowing rotational movement of the movable portion.

Published Unexamined Application 2008-122531 (Patent Citation 2) describes in image blurring compensation device. This is image blurring compensation device is furnished with three linear motors, and the lines of action of the drive forces generated by these three linear motors are respectively directed in the radial direction of a circle centered on image stabilizing lens optical axis A.

Patent Citation 1
Published Unexamined Application 2006-106177
Patent Citation 2
Published Unexamined Application 2008-122531

DISCLOSURE OF THE INVENTION

Problems the Invention Seeks to Resolve

However, the actuator described in Published Unexamined Application 2006-106177 had the problem that to increase the drive force generated by the linear motor required increasing the outside diameter of the actuator. In other words, the driving force generated by each of the linear actuators was generated by the magnetic flux generated by the drive magnets 122 and the interaction of currents flowing in the shaded portion of FIG. 9 in each of the drive coils 120. It was therefore necessary to increase the shaded portion of each of the drive coils 120 in order to increase the drive force generated by each of the linear motors, leading to the problem that the outer diameter of the actuator is a whole was expanded.

In the actuator described in Published Unexamined Application 2008-122531, the lines of action of the drive force generated by the linear motors were directed in the radial direction of the circle, therefore the drive force could be increased by expanding each of the drive coils in the circumferential direction. Thus in this type of actuator, an increase in drive force did not directly lead to enlargement of the actuator.

In the actuator described in Published Unexamined Application 2008-122531, however, the drive force from each of the linear motors is radially directed, resulting in the problem that rotational movement of the image stabilizing lens could not be directly controlled. This led to an unnecessary rotational movement of the image stabilizing lens accompanying translational movement thereof, thereby decreasing blur compensation accuracy.

Brief Summary of the Invention

Therefore the present invention has the object of providing an anti-vibration actuator and lens unit/camera furnished therewith capable obtaining a high drive force without enlarging the device.

The present invention has the further object of providing an anti-vibration actuator and lens unit/camera furnished therewith capable of effectively suppressing unnecessary rotational movement of the image stabilizing lens.

Means for Resolving the Problems

In order to resolve the problem described above, the present invention is an anti-vibration actuator for moving an image stabilizing lens within a plane perpendicular to the optical axis thereof, having a fixed portion; a movable portion to which the image stabilizing lens is attached; a movable portion support means for supporting the movable portion to allow for translational and rotational movement within a plane parallel to the fixed portion; a first drive means furnished with a first drive magnet and a first drive coil disposed in opposition thereto, oriented in such a way that the line of action of the drive force driving the movable portion relative to the fixed portion is directed in essentially the radial direction of the image stabilizing lens; a second drive means furnished with a second drive magnet and a second drive coil disposed in opposition thereto, oriented in such a way that the line of action of the drive force driving the movable portion relative to the fixed portion is essentially perpendicular to the line of action of the drive force of the first drive means and is oriented in essentially the radial direction of the image stabilizing lens; a third drive means furnished with a third drive magnet and a third drive coil disposed in opposition thereto, oriented so that the line of action of the drive force driving the movable portion with respect to the fixed portion is directed in essentially the circumferential direction of the image stabilizing lens; first, second, and third position detection elements for detecting the respective positions of the movable portion relative to the fixed portion in a direction parallel to the line of action of each of the drive forces of the third drive means; and a control section for controlling current sourced to the first, second, and third drive coils based on the positions detected by the first, second, and third position detecting elements, to move the movable portion to a specified position; wherein the first position detection element is disposed such that its entire detector section passes through the center of gravity of the movable portion, in the region in which the third drive means is not disposed, of the two regions partitioned by a straight line parallel to the line of action of the drive force from the first drive means; and the second detection element is disposed such that its entire detector section passes through the center of gravity of the movable portion, in the region in which the third drive means is not disposed, of the two regions partitioned by a straight line parallel to the line of action of the drive force from the second drive means.

In the present invention thus constituted, the movable portion support means allows for translational movement and rotational movement of the movable portion relative to the fixed portion. The first drive means and the second drive means respectively generate drive forces directed in essentially the radial direction of the image stabilizing lens, while the third drive means generates a drive force directed in essentially the circumferential direction of the image stabilizing lens. First, second, and third detection elements respectively detect the position of the movable portion relative to the fixed portion in directions parallel to the lines of action of each of the drive forces from the first, second, and third drive means. The control section controls current sourced to each of the drive coils in the drive means based on positions detected by each position detection element.

In the present invention thus constituted, the first drive means and the second drive means generate a drive force in essentially a radial direction, therefore a large drive force can be obtained without increasing the size of the anti-vibration actuator.

Also, in the present invention thus constituted, the third drive means generates a drive force in essentially a circumferential direction, therefore the movable portion support means can suppress unnecessary rotational movement of the movable portion while supporting the movable portion in a way which allows for translational and rotational movement.

Further, the present invention is an anti-vibration actuator for moving an image stabilizing lens within a plane perpendicular to the optical axis thereof, having a fixed portion; a movable portion to which the image stabilizing lens is attached; a movable portion support means for supporting the movable portion to allow for translational and rotational movement within a plane parallel to the fixed portion; a first drive means furnished with a first drive magnet and a first drive coil disposed in opposition thereto, oriented in such a way that the line of action of the drive force driving the movable portion relative to the fixed portion is directed in essentially the radial direction of the image stabilizing lens; a second drive means furnished with a second drive magnet and a second drive coil disposed in opposition thereto, oriented in such a way that the line of action of the drive force driving the movable portion relative to the fixed portion is essentially perpendicular to the line of action of the drive force of the first drive means and is oriented in essentially the radial direction of the image stabilizing lens; a third drive means furnished with a third drive magnet and a third drive coil disposed in opposition thereto, oriented so that the line of action of the drive force driving the movable portion with respect to the fixed portion is directed in essentially the circumferential direction of the image stabilizing lens; first, second, and third position detection elements for detecting the respective positions of the movable portion relative to the fixed portion in a direction parallel to the line of action of each of the drive forces of the third drive means; and a control section for controlling current sourced to the first, second, and third drive coils based on the positions detected by the first, second, and third position detecting elements, to move the movable portion to a specified position; wherein the first and second position detection elements are disposed such that the entire detector sections thereof are within a region which is in a position diagonally opposed to the region in which the third drive means is disposed, from among the four regions partitioned by the drive force lines of action from the first drive means and the second drive means.

In the present invention, the first, second, and third position detection elements are preferably disposed in opposition to the first, second, and third drive magnets so as to detect the positions of each of the drive magnets.

In the present invention, the drive force which can be generated by the third drive means is preferably smaller than the drive force which can be generated by the first and second drive means.

In the present invention thus constituted, the drive force generated by the third drive means, which generates drive force in essentially a circumferential direction, is small, therefore the dimension of the third drive means drive coil can be reduced in the radial direction, thereby reducing the size of the anti-vibration actuator.

In the present invention, the first, second, and third position detection elements are preferably Hall elements.

In the present invention thus constituted, the structure is simple and the positions of each drive magnet can thus be detected.

In the present invention, the first, second, and third position detection elements are preferably disposed inside the first, second, and third drive coils.

In the present invention thus constituted, position can be detected close to the point at which each drive means generates drive force, therefore the anti-vibration actuator can be accurately controlled.

The lens unit of the present invention is provided with a lens barrel, an imaging lens disposed within this lens barrel, and the anti-vibration actuator of the present invention attached to the lens barrel.

Moreover, the camera of the present invention has the lens unit of the present invention and a camera body to which this lens unit is attached.

Effect of the Invention

The anti-vibration actuator and lens unit/camera furnished therewith of the present invention can provide high drive force without enlargement of the device.

The anti-vibration actuator and lens unit/camera furnished therewith of the present invention also enables effective suppression of unnecessary rotational movement of the image stabilizing lens.

DETAILED DESCRIPTION OF THE INVENTION

We next discuss embodiments of the present invention with reference to the attached drawings.

Figure 1:
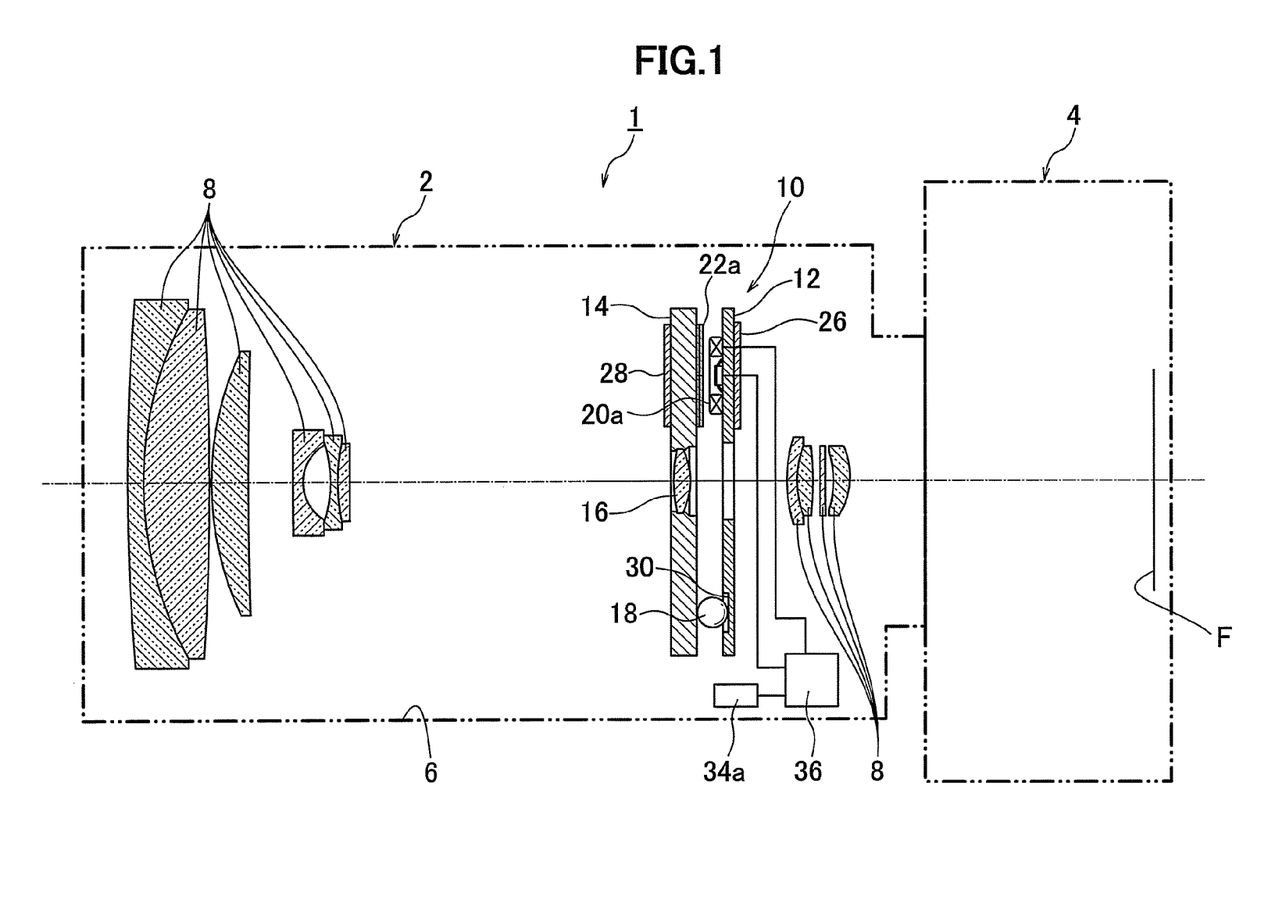
FIG. 1 Cross-section of a camera according to an embodiment of the present invention.

First, referring to FIGS. 1 through 8, we discuss a camera according to an embodiment of the present invention. FIG. 1 is a cross-section of a camera according to an embodiment of the present invention.

As shown in FIG. 1, a camera 1 in an embodiment of the present invention comprises a lens unit 2 and a camera body 4. The lens unit 2 is furnished with a lens barrel 6, multiple imaging lenses 8 disposed within the lens barrel, an anti-vibration actuator 10 for moving an image stabilizing lens 16 within a specified plane, and gyros 34a and 34b (only 34a is shown in FIG. 1) serving as vibration detection means for detecting vibration in the lens barrel 6.

In the camera 1 of this embodiment of the present invention, vibration is detected by the gyros 34a and 34b; the anti-vibration actuator 10 is moved based on detected vibration, thereby moving the image stabilizing lens 16 and stabilizing the image focused on the film surface F inside the camera body 4. In the present embodiment piezoelectric gyros are used for the gyros 34a and 34b. Note that in the present embodiment, the image stabilizing lens 16 comprises a single lens, but the lens used to stabilize the image can also be a set of multiple lenses. In this Specification, the term "image stabilizing lens" includes both a single lens and multiple lenses for stabilizing an image.

The lens unit 2 is attached to the camera body 4 and is constituted to form an image of incident light on the film surface F.

The essentially cylindrical lens barrel 6 holds within it multiple imaging lenses 8; focus can be adjusted by moving a portion of those imaging lenses 8.

Figure 2:
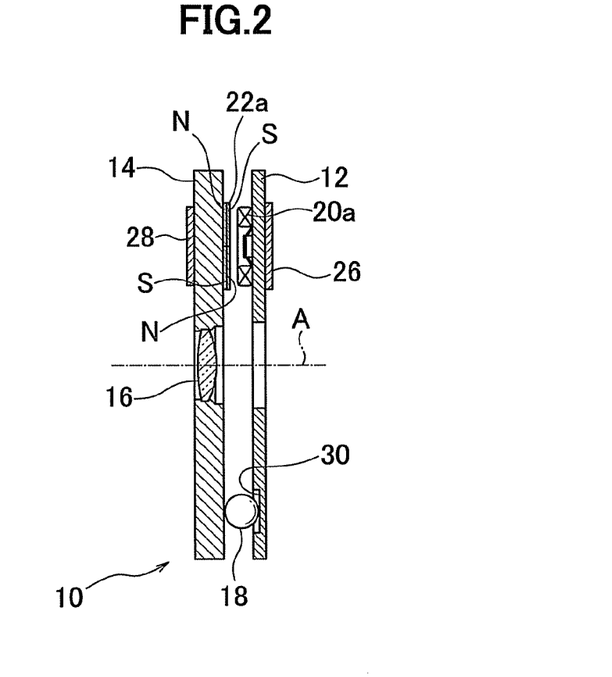
FIG. 2 Side view cross-section of an anti-vibration actuator provided in a camera according to an embodiment of the present invention.
Figure 3:
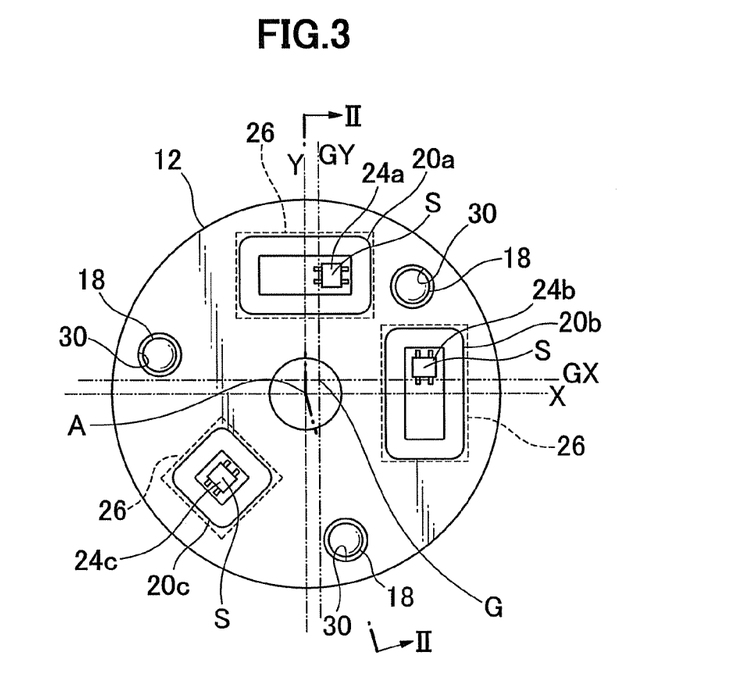
FIG. 3 Front elevation showing the anti-vibration actuator with the movable portion removed.
Figure 4:
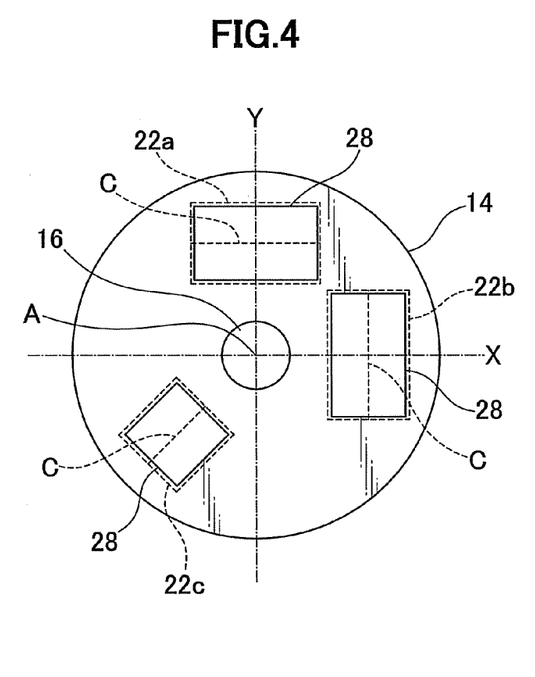
FIG. 4 Front elevation of the anti-vibration actuator movable portion.

We next discuss the anti-vibration actuator 10, referring to FIGS. 2 through 4. FIG. 2 is a side view section of the anti-vibration actuator 10. FIG. 3 is a front elevation showing the anti-vibration actuator 10 with the movable portion removed; FIG. 4 is a front elevation of the anti-vibration actuator 10 movable portion. Note that FIG. 2 is a cross-section showing the anti-vibration actuator 10 split along line II-II in FIG. 3.

As shown in FIGS. 2 through 4, the anti-vibration actuator 10 comprises a fixed plate 12 serving as the fixed portion within the lens barrel 6, a moving frame 14 serving as the movable portion thereof, supported so as to be translationally and rotationally movable with respect to the fixed plate 12, and three steel balls 18 serving as movable portion support means for supporting the moving frame 14. Furthermore, the anti-vibration actuator 10 comprises a first drive coil 20a, a second drive coil 20b, and a third drive coil 20c attached to the fixed plate 12; a first drive magnet 22a, a second drive magnet 22b, and a third drive magnet 22c attached at positions respectively corresponding to each of the drive coils 20a, 20b, and 20c; and a first magnetic sensor 24a, a second magnetic sensor 24b, and a third magnetic sensor 24c, respectively serving as the first, second, and third position detection elements disposed within each of the drive coils 20a, 20b, and 20c.

The anti-vibration actuator 10 comprises three pull-in yokes 26 attached to the rear side of the fixed plate 12 for pulling in the moving frame 14 to the fixed plate 12 using the magnetic force of each of the drive magnets; and a back yoke 28 attached to the opposite side of each of the drive magnets to effectively direct the magnetic force of each of the drive magnets toward the fixed plate 12. Note that the first drive coil 20a, the second drive coil 20b, and the third drive coil 20c, as well as the first drive magnet 22a, the second drive magnet 22b, and the third drive magnet 22c attached in corresponding positions thereto form the respective first, second, and third drive means for driving the moving frame 14 relative to the fixed plate 12.

Furthermore, as shown in FIG. 1, the anti-vibration actuator 10 comprises a controller 36 serving as a control section for controlling the current sourced to the first, second, and third drive coils 20a, 20b, and 20b based on vibration detected by the gyros 34a and 34b, and on moving frame 14 position information detected by the first, second, and third magnetic sensors 24a, 24b, and 24c.

The anti-vibration actuator 10 moves the moving frame 14 translationally within a plane parallel to the film plane F relative to the fixed plate 12 attached to the fixed lens barrel 6; by this means the image stabilizing lens 16 attached to the moving frame 14 is driven in such a way that no blurring of the image focused on the film plane F occurs even if the lens barrel 6 vibrates.

The fixed plate 12 is essentially doughnut-shaped; first, second and third drive coils 20a, 20b, and 20c are disposed thereon. As shown in FIG. 3, these three drive coils are disposed in such a way that their centers are respectively disposed on a circle centered on the optical axis of the lens unit 2. In the present embodiment, the first drive coil 20a is disposed vertically above the optical axis: the second drive coil 20b is disposed in a horizontal direction relative to the optical axis, and the drive coil 20c is disposed at a center angle separation of 135° relative to the first drive coil 20a and the second drive coil 20b. As a result, the center angle between the first drive coil 20a and the second drive coil 20b is 90°, the center angle between the second drive coil 20b and the third drive coil 20c is 135°, and the center angle between the drive coils 20c and 20a is 135°.

The first, second, and third drive coils 20a, 20b, and 20c are respectively wound and so that their windings form a rectangle with rounded corners. The first and second drive coils 20a and 20b are essentially rectangular, disposed so that the center lines bisecting the long sides thereof lie on the Y axis and X axis. In other words, the first and second drive coils 20a and 20b are disposed such that the long sides thereof face in the circumferential direction of a circle whose center is the optical axis A. The third drive coil 20c is essentially rectangular and smaller than the first and second drive coils, and is disposed such that the centerline bisecting its short sides is oriented radially in a circle centered on optical axis A.

The moving frame 14 has an essentially doughnut shaped form, and is disposed in parallel to the fixed plate 12 so as to overlap the fixed plate 12. An image stabilizing lens 16 is attached at the center opening of the moving frame 14. First, second, and third drive magnets 22a, 22b, and 22c are respectively disposed at positions corresponding to the first, second, and third drive coils 20a, 20b, and 20c on the circumference of the moving frame 14. The first and second drive magnets 22a and 22b are essentially rectangular and are disposed so that the centerlines bisecting their short sides lie on the Y axis and X axis respectively. The first and second drive magnets 22a and 22b are magnetized so the centerline bisecting the long sides thereof forms a magnetized field line. The third drive coil 20c is essentially rectangular and is smaller than the second drive magnet; disposed so that the centerline bisecting its long sides matches the radial direction of the circle. The third drive magnet 22c is magnetized so that the centerline bisecting the long sides thereof forms a magnetized field line. In other words, the second drive magnets 22a and 22b are disposed in such a way that their lines of magnetization are oriented circumferentially around a circle centered on optical access A, while the third drive magnet 22c is disposed so that the line of magnetization is oriented in the radial direction of the circle.

Note that in the present embodiment the center of gravity of the movable portion which includes the moving frame 14, the image stabilizing lens 16, and the first, second, and third drive magnets 22a, 22b, and 22c, is placed at point G in FIG. 3.

As shown in FIGS. 2 and 3, the three steel balls 18 are sandwiched between the fixed frame 12 and the moving frame 14, and are respectively disposed on a circle centered on optical axis A, each separated by a center angle of 120°. Each of the steel balls 18 is disposed in an indentation 34 corresponding to the steel balls 18 on the fixed frame 12, and are thus prevented from falling out. Also, as will be discussed below, the moving frame 14 is pulled in by a drive magnet to the fixed plate 12, therefore the steel balls 18 are sandwiched between the fixed plate 12 and the moving frame 14. The moving frame 14 is thus supported on a plane parallel to the fixed plate 12, and each of the steel balls 18 is sandwiched as it rolls, thereby allowing for translational and rotational movement of the moving frame 14 in any desired direction with respect to the fixed plate 12.

While steel spherical bodies are used for the steel balls 18 in the present embodiment, the steel balls 18 do not necessarily have to be spherical bodies. Any desired steel balls 18 may be used so long as they have an essentially spherical surface in contact with the fixed plate 12 and the moving frame 14 during operation of the anti-vibration actuator 10. In the present Specification, this form is referred to as a spherical body.

Back yokes 28 are essentially rectangular, and are attached at positions corresponding to each of the respective drive magnets on the side of the moving frame 14 to which drive magnets are not attached. These back yokes 28 cause the magnetic flux of each of the drive magnets to be efficiently directed toward the fixed plate 12.

Pull-in yokes 28 are essentially rectangular, and are attached to positions corresponding to each of the respective drive coils on the side of the fixed plate 12 to which drive coils are not attached. The moving frame 14 is pulled into the fixed plate 12 by the magnetic force exerted by each of the drive magnets on the pull-in yokes 26.

As shown in FIG. 2, the magnetization boundary line C of the first drive magnet 22a is disposed to pass through the center point of each of the long sides of the first drive magnet 22a, while polarity also changes in the thickness direction of the first drive magnet 22a. In the present embodiment, the lower left corner in FIG. 2 is an S pole, the lower right an N pole, the upper left an N pole, and the upper right an S pole. The second drive magnet 22b is similarly magnetized, and is attached to the moving frame 14 at an angle rotated by 90° (FIG. 4). Note that in the present Specification, the magnetization boundary line C refers to the line connecting the points at which the S pole changes to the N pole between the two ends of the drive magnet when these are respectively the S pole and the N pole.

By being thus magnetized, the first and second drive magnets 22a and 22b exert magnetism on the long side portions of the rectangular first and second drive quotes 20a and 20b. Therefore when a current flows in the first drive coil 20a, a drive force is generated in the vertical direction along the Y axis in the interval with the first drive magnet 22a, and when a current flows a second drive coil 20b, a drive force is generated in the horizontal direction axis in the interval with the second drive magnet 22b.

The line of action of the drive force from the first drive means constituted by the first drive coil 20a and the first drive magnet 22a is directed in essentially the radial direction of the image stabilizing lens 16, while the line of action of the drive force from the second drive means constituted by the second drive coil 20b and the second drive magnet 22b is essentially perpendicular to the line of action of the drive force from the first drive means and is directed in essentially the radial direction of the image stabilizing lens 16.

At the same time, as shown in FIG. 4, the third drive magnet 22c is positioned with a radial orientation in a circle centered on the optical axis A, exerting magnetism on the long side portion of the rectangular third drive coil 20c, which is oriented toward the radius. Thus when a current flows in the third drive coil 20c, a drive force is generated in the circumferential direction of the circle centered on the optical axis A in the interval with the third drive magnet 22c. Furthermore, because the third drive coil 20c and the third drive magnet 22c constituting the third drive means are formed to be smaller than the second drive coil and the first and second drive magnets, the drive force generated by the third drive means when the same current flows in the drive coils is smaller than the drive force generated in the first and second drive means.

In the present embodiment, the center of gravity of the anti-vibration actuator 10 movable portion (the moving frame 14, the image stabilizing lens the role 16, and each of the drive magnets) is positioned approximately on the optical axis A, therefore the moving frame 14 is translationally moved in an approximately accurate manner in the vertical direction by the drive force of the first drive means, which is radially oriented in a circle centered on optical axis A. Similarly, the moving frame 14 is translationally moved in an approximately accurate manner in the horizontal direction by the drive force of the second drive means. The third drive means is provided to suppress the very small rotational movement generated in conjunction with the translational movement of moving frame 14, therefore the drive force required to be generated by the third drive means is smaller than that of the first and second drive means.

As shown in FIGS. 2 and 3, a first magnetic sensor 24a, a second magnetic sensor 24b, and a third magnetic sensor 24c are respectively attached on the inside of each drive coil. The first, second, and third magnetic sensors 24a, 24b, and 24c are constituted to measure the position of the moving frame 14 with respect to the fixed plate 12 in a direction parallel to the line of action of the drive force generated by the third drive means. When the moving frame 14 is in the center position, the magnetic sensors are disposed such that their sensitivity center point S is positioned on the magnetic center axis line C of each of the drive magnets 22. In the present embodiment, Hall elements are used as the magnetic sensors.

The output signal from the magnetic sensor is 0 when the magnetic sensor sensitivity center point S is on the drive magnet magnetization boundary line C, and the output signal from the magnetic sensor changes when the drive magnet moves and the magnetic sensor sensitivity center point S moves away from the drive magnet magnetization boundary line C. In normal operation of the anti-vibration actuator 10, in which the amount of movement of the drive magnets is extremely small, the signal output is essentially proportional to the distance moved in the direction perpendicular to the drive magnet magnetization boundary line C.

Therefore the first magnetic sensor 24a outputs a signal which is essentially proportional to the amount of translational movement by the moving frame 14 in the Y axis direction, and the second magnetic sensor 24b outputs a signal which is essentially proportional to the amount of translational movement by the moving frame 14 in the X axis direction. The third magnetic sensor 24c outputs a signal which includes most of the rotational movement component of the moving frame 14. The position to which the moving frame 14 has moved translationally and rotationally with respect to the fixed frame 12 can thus be identified based on the signals detected by the first, second, and third magnetic sensors 24a, 24b, and 24c.

The first and second magnetic sensors 24a and 25b are disposed in such a way that the entirety of their detector sections is positioned within a region (corresponding to the first quadrant) which is positioned in diagonal opposition to the region (corresponding to the third quadrant) in which the third drive means is disposed, from among the four regions (in the present embodiment, the first through fourth quadrants formed by the X and Y axes, with optical axis A as origin) partitioned by the lines of action of the magnetic force generated by the first and second drive means (lying on the X axis and the Y axis in the present embodiment). As described below, the position of the moving frame 14 can be accurately controlled by the disposition of the first and second magnetic sensors 24a and 24b.

That is to say the first magnetic sensor 24a passes through the center of gravity G of the anti-vibration actuator 10 movable portion and is disposed in the region in which the third drive means is not disposed (the region to the right side of the double dot-and-dash line GY in FIG. 3) of the two regions partitioned by straight lines parallel to the lines of action of the drive force generated by the first drive means (the double dot-and-dash line GY), while the second magnetic sensor 24b passes through the center of gravity G of the anti-vibration actuator 10 movable portion and is disposed in the region in which the third drive means is not disposed (the region above the double dot-and-dash line GX in FIG. 3), from among the two regions partitioned by the straight lines parallel to the lines of action of the drive force generated by the second drive means, therefore positioning of the moving frame 14 can be accurately controlled, as described below.

Note that the accuracy of the first magnetic sensor 24a increases as it moves away from the double dot-and-dash line GY in the direction perpendicular to the line of action of the magnetic force generated by the first drive means (i.e., as it moves to the right side of the double dot-and-dash line GY in FIG. 3), and the second magnetic sensor 24b improves in accuracy as it moves away from the double dot-and-dash line GX in the direction perpendicular to the line of action of the magnetic force generated by the second drive means (i.e., as it moves to the right side of the double dot-and-dash line GX in FIG. 3).

Figure 5:
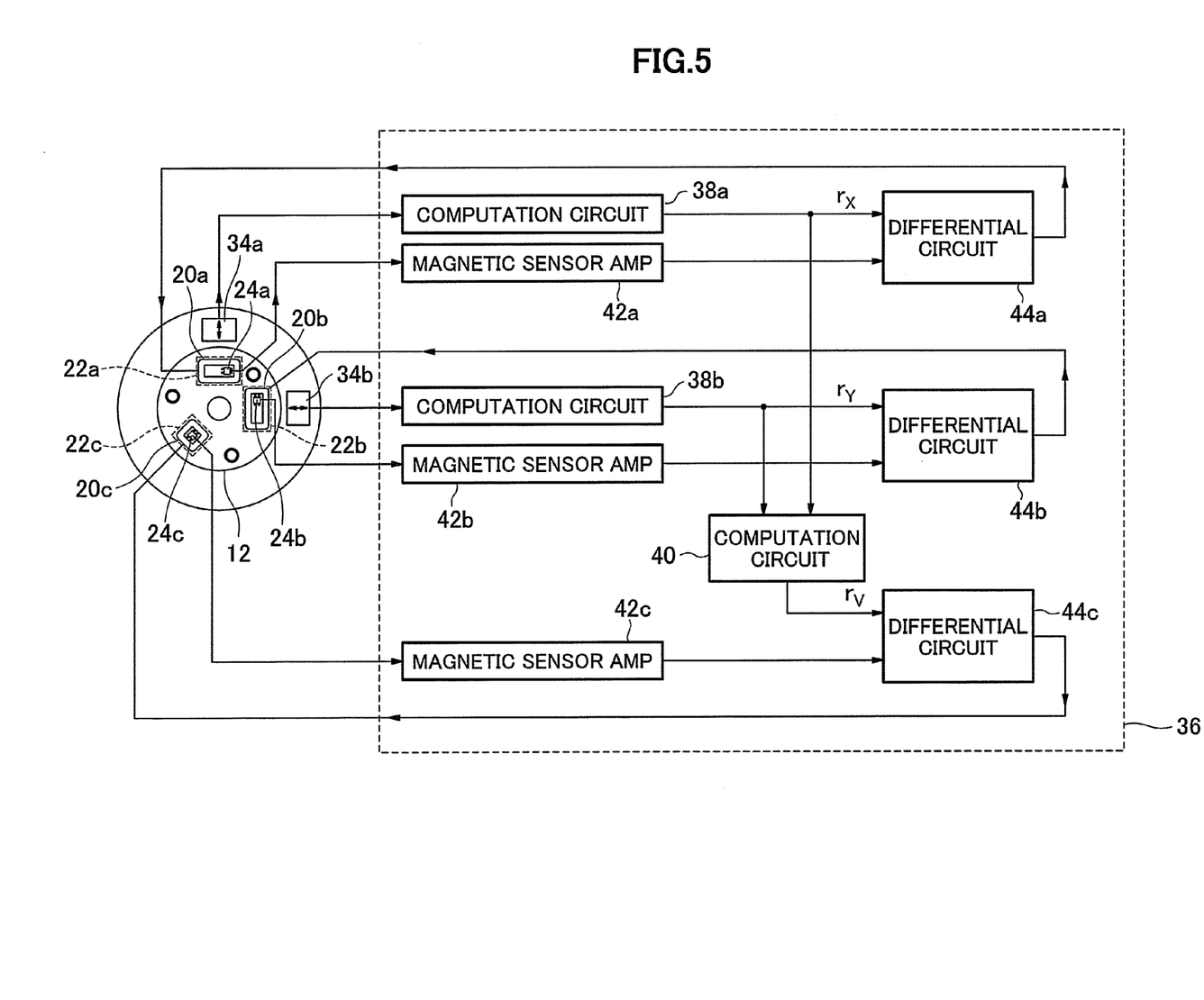
FIG. 5 Block diagram showing signal processing in the controller.

Next, referring to FIG. 5, we discuss control of the anti-vibration actuator 10. FIG. 5 is a block diagram showing signal processing occurring in the controller 36. As shown in FIG. 5, vibration of the lens unit 2 is detected from moment to moment by the gyros 34a and 34b and is input to computation circuits 38a and 38b built into the controller 36. In the present embodiment, the gyro 34a is constituted to detect the angular velocity of the pitch movement of the lens unit 2, and the gyro 34b is constituted to detect the angular acceleration of the yaw movement thereof.

The computation circuits 38a and 38b, based on angular velocities input from moment to moment from the gyros 34a and 34b, generate lens position command signals to command the position to which the image stabilizing lens 16 should be moved using a time series. In other words, the computation circuit 38 time-integrates the angular velocity of the pitch motion detected by the gyro 34a, generating the vertical component for the lens position command signal by adding in a specified correction signal; similarly, the computation circuit 38b generates the horizontal component of the lens position command signal based on yaw motion angular velocity detected by the gyro 34b. By moving the image stabilizing lens 16 from moment to moment in response to lens position command signals obtained in this manner, an image focused on the film plane F inside the camera body 4 can be stabilized without blurring the image, even when the lens unit 2 vibrates during a photographic exposure.

The controller 36 controls the current sourced to the first, second, and third drive coils 20a, 20b, and 20c so that the image stabilizing lens 16 moves to the position commanded by the lens position command signal generated by the computational circuits 38a and 38b.

The amount of movement in the vertical direction of the first drive magnet 22a relative to the first drive coil 20a as measured by the first magnetic sensor 24a is amplified by a specified factor by a magnetic sensor amp 42a. A differential circuit 44a sources a current to the first drive coil 20a which is proportional to the difference between the vertical component of the lens position command signal output from the computational circuit 38a and the amount of vertical movement of the first drive magnet 22a relative to the first drive coil 20a output from the magnetic sensor amp 42a. Therefore current ceases to flow to the first drive coil 20a when the difference between the vertical component of the lens position commanded by the lens position command signal and the output from the magnetic sensor amp 42a disappears, and the drive force operating on the first drive magnet 22a goes to 0.

Similarly, the amount of horizontal movement of the second drive magnet 22b relative to the second drive coil 20b, as measured by the second magnetic sensor 24b, is amplified by a specified factor by a magnetic sensor amp 42b. A differential circuit 44b sources a current to the first drive coil 20b which is proportional to the difference between the horizontal component of the lens position command signal output from the computational circuit 38b and the amount of horizontal movement of the first drive magnet 22a relative to the first drive coil 20a output from the magnetic sensor amp 42b. Therefore current ceases to flow to the first drive coil 20a when the difference between the vertical component of the lens position commanded by the lens position command signal and the output from the magnetic sensor amp 42b disappears, and the drive force operating on the second drive magnet 22b goes to 0.

The amount of movement of the third drive magnet 22c relative to the third drive coil 20c as measured by the third magnetic sensor 24c is amplified by a specified factor using a magnetic sensor amp 42c. At the same time, the computation circuit 40 generates a specified signal based on the vertical component of the lens position command signal output from the computation circuit 38a and the horizontal component of the lens position command signal output from the computation circuit 38b. This signal indicates the position to which the third drive magnet 22c is to move relative to the third drive coil 20c when the moving frame 14 has been moved translationally to a position directed by the lens position command signal, and can be obtained geometrically based on each of the magnetic sensor positions.

When the second drive magnet 22b is moved to the horizontal position commanded by the lens position command signal, the first drive magnet 22a is moved to the vertical position commanded by the lens position command signal, and moving frame 14 has been accurately translationally moved, the output signals from the magnetic sensor amp 42 and the computation circuit 40 match, therefore current ceases to flow to the third drive coil 20c, and the drive force acting on the third drive magnet 22c goes to 0.

Even in cases where the first and second drive magnets 22a and 22b are moved to the positions commanded by the lens position command signal, the magnetic sensor amp 42c output signal and the computation circuit 40 output signal will not match if the moving frame 14 has been rotationally as well as translationally moved, so current will flow to the third drive coil 20c. The current flowing to the third drive coil 20c causes a drive force to act on the third drive magnet 22c, causing rotation of the moving frame 14.

Figure 6:
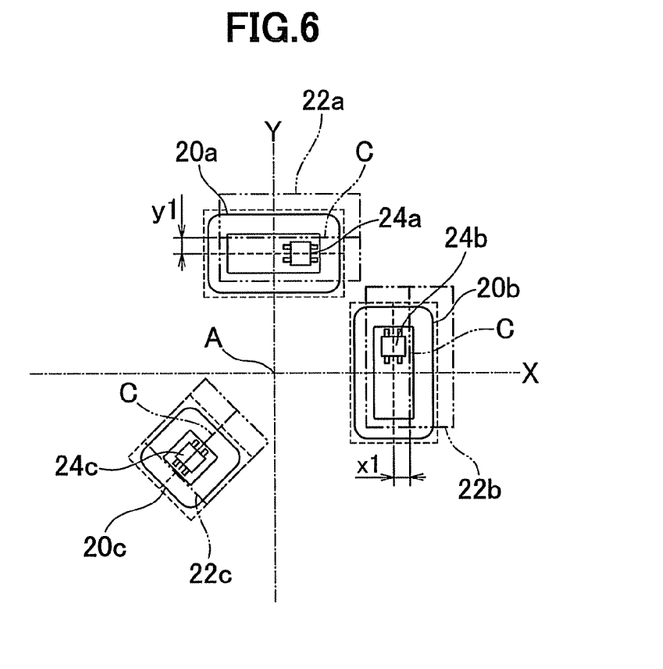
FIG. 6 Diagram showing the positional relationships between each drive coil and each drive magnet when the moving frame is translationally moved in a diagonally upward direction relative to the fixed plate.
Figure 7:
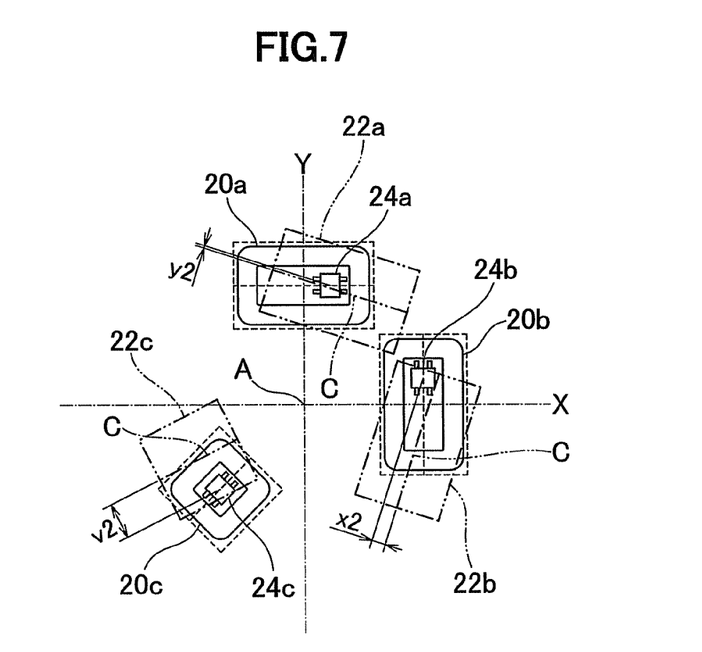
FIG. 7 Diagram showing the positional relationship between each drive coil and each drive magnet when the moving frame is moved about the optical axis relative to the fixed plate.
Figure 8:
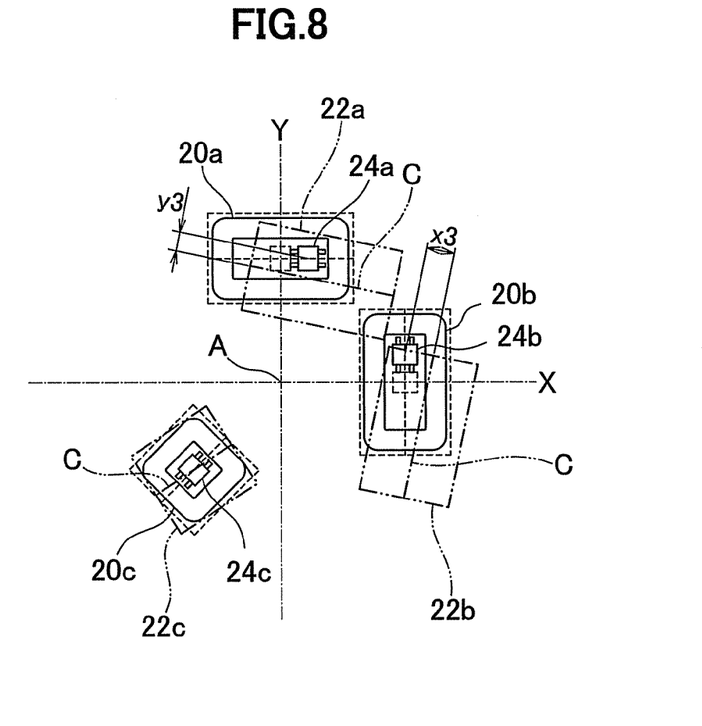
FIG. 8 Diagram showing the positional relationship between each drive coil and each drive magnet when the moving frame is moved about the third magnetic sensor relative to the fixed plate.

Next, referring to FIGS. 6 through 8, we discuss the relationship between movement of the moving frame 14 relative to the fixed plate 12, and the output signal from the various magnetic sensors. FIG. 6 shows the positional relationship between each of the drive coils and each of the drive magnets when the moving frame 14 is translationally moved relative to the fixed plate 12 in a diagonally upward direction. FIG. 7 shows the positional relationship between each of the drive coils and each of the drive magnets when the moving frame 14 is rotated relative to the fixed plate 12 about the optical axis A. In addition, FIG. 8 shows the positional relationship between each of the drive coils and each of the drive magnets when the moving frame 14 is rotated relative to the fixed plate 12 about the third magnetic sensor 24c.

First, as shown in FIG. 6, when the moving frame 14 is translationally moved in a diagonally upward direction at 45° relative to the fixed plate 12, the first, second, and third drive magnets 22a, 22b, and 22c are respectively moved from initial positions shown by a dotted line (the position at which the optical axis of the image stabilizing lens 16 matches the optical axis A of another imaging lens 8, and the magnetization boundary lines C of the first and second drive magnets are respectively oriented in a horizontal and a vertical direction) to positions on the double dot-and-dash line. At this position, the first magnetic sensor 24a generates a signal proportional to the vertical distance y1 between the first drive magnet 22a magnetization boundary line C and the first magnetic sensor 24a, while the second magnetic sensor 24b generates a signal proportional to the horizontal distance x1 between the first drive magnet 22b magnetization boundary line C and the second magnetic sensor 24b. Since the magnetization boundary line C of the third drive magnet 22c is still positioned on the third magnetic sensor 24c, the signal generated by the third magnetic sensor 24c is essentially 0. The first magnetic sensor 24a thus primarily detects translational movement of the moving frame 14 in the vertical direction, and the second magnetic sensor 24b primarily detects translational movement of the moving frame 14 in the horizontal direction.

Next, as shown in FIG. 7, when the moving frame 14 is rotated relative to the fixed plate 12 about the optical axis A, the first, second, and third drive magnets 22a, 22b, and 22c are moved from an initial position shown by the dotted line to the respective positions shown by the double dot-and-dash lines. In this position, the first magnetic sensor 24a generates a signal proportional to the distance y2 between the first drive magnet 22a magnetization boundary line C and the first magnetic sensor 24a, while the second magnetic sensor 24b generates a signal proportional to the distance x2 between the first drive magnet 22b magnetization boundary line C and the second magnetic sensor 24b; the third magnetic sensor 24c generates a signal proportional to the distance v2 between the third drive magnet 22c magnetic boundary line C and the third magnetic sensor 24c. Here, the distance v2 detected by the third magnetic sensor 24c is greater than distances x2 and y2, and the magnetic sensor 24c primarily detects rotational movement of the moving frame 14.

Furthermore, as shown in FIG. 8, when a moving frame 14 has been rotated about the third magnetic sensor 24c relative to the fixed plate 12, the first, second, and third drive magnets 22a, 22b, and 22c are moved from the position shown by the dotted line to the positions respectively shown by the double dot-and-dash lines. At this position, the first magnetic sensor 24a generates a signal proportional to the distance y3 between the first drive magnet 22a magnetization boundary line C and the first sensor 24a, and the second magnetic sensor 24b generates a signal proportional to the distance x3 between the second drive magnet 22b magnetization boundary line C and the second magnetic sensor 24b. Since the third drive magnet 22c magnetization boundary line C is positioned on the third magnetic sensor 24c, the signal generated by the third magnetic sensor 24c is essentially 0.

Rotational movement of the moving frame 14 about the third magnetic sensor 24c is thus not detected by the third magnetic sensor 24c, but rather by the first and second magnetic sensors 24a and 24b. However, as shown by the dotted lines in FIG. 8, when the first and second magnetic sensors 24a and 24b are respectively disposed on the Y and X axes, the distance between the first magnetic sensor 24a and the first drive magnet 22a magnetization boundary line C, as well as the distance between the second magnetic sensor 24b and the second drive magnet 22b, becomes extremely short. In this case therefore, detection of rotational movement by the moving frame 14 around the third magnetic sensor 24c becomes difficult, as does suppression of rotational movement by the magnetic frame 14 of this type.

In the anti-vibration actuator 10 of the present embodiment, the disposition of the entire sensor section of the first and second magnetic sensors 24a and 24b in the region positioned diagonally opposite the region in which the third drive means is disposed, from among the four regions partitioned by the lines of action of the drive force generated by the first and second drive means, enables accurate detection of rotational movement of the moving frame 14 about various center points. In the anti-vibration actuator 10 of the present embodiment, the first magnetic sensor 24a passes through the center of gravity G in the movable portion of the anti-vibration actuator 10 and is disposed in the region in which the third drive means is not disposed, from among the two regions partitioned by straight lines parallel to the lines of action of the drive force generated by the first drive means, and magnetic sensor 24b passes through the center of gravity G and is disposed in the region in which the third drive means is not disposed, from among the two regions partitioned by straight lines parallel to the line of action of the drive force generated by the second drive means, thereby enabling accurate detection of rotational movement of the moving frame 14 about various center points. Rotational movement of the moving frame 14 due to the drive force from each of the drive means is therefore suppressed, while the moving frame 14 is supported in a way that permits translational and rotational movement, therefore the moving frame 14 is translationally moved in an accurate manner.

We now discuss the mode of operation of a camera 1 according to an embodiment of the present invention, referring to FIGS. 1 through 5. First, turning the anti-shake startup switch (not shown) on the camera 1 to the ON position activates the anti-vibration actuator 10 provided on the lens unit 2. The gyros 34a and 34b attached to the lens unit 2 detect vibration in a specified frequency band from moment to moment, outputting this to computation circuits 38a and 38b built into the controller 36. The gyro 34a outputs to the computation circuit 38a a signal for the angular velocity in the pitch direction of the lens unit 2, and the gyro 34b outputs to the computation circuit 38b a signal for the angular velocity in the yaw direction thereof. The computation circuit 38a performs a time integration of the input angular velocity signal, calculates a pitch angle, adds to this a specified correction signal, and generates a vertical lens position command signal. Similarly, the computation circuit 38b time integrates the input angular velocity signal, calculates the yaw angle, adds to this a specified correction signal, and generates a horizontal lens position command signal. By moving the image stabilizing lens 16 from moment to moment to the positions commanded by the lens position command signal using a time series from the calculation circuits 38a and 38b, the image focused on the film surface F of the camera body 4 is stabilized.

The vertical lens position command signal output by the computation circuit 38a is input to an actuating circuit 44a, and the horizontal lens position command signal output by the computation circuit 44b is input to an actuating circuit 44b. The outputs of computation circuits 38a and 38b are input to the computation circuit 40, and the computation circuit 40 outputs a signal computed according to a specified relational expression, then outputs a result to an actuating circuit 44c.

At the same time, the first magnetic sensor 24a disposed inside the first drive coil 20a outputs a detection signal to the magnetic sensor amp 42a, as does the second magnetic sensor 24b disposed inside the second drive coil 22 to the magnetic sensor amp 42b, and the third magnetic sensor 24c inside the third drive coil 20c to the magnetic sensor amp 42c. Each of the magnetic sensor detection signals amplified by the magnetic sensor amps 42a, 42b, and 42c is respectively input to actuating circuits 44a, 44b, and 44c.

The actuating circuits 44a, 44b, and 44c respectively generate a voltage in response to the difference between the detection signal input from each of the magnetic sensors and the signals input from each of the computation circuits 38a, 38b, and 38c, and source a current proportional to that voltage to each of the drive coils. When a current flows to each of the drive coils, a magnetic field proportional to the current is generated. The first, second, and third drive magnets 22a, 22b, and 22c disposed to correspond to the first, second, and third drive coils 20a, 20b, and 20c respectively receive a drive force from this magnetic field, and the moving frame 14 is moved. When the moving frame 14 is moved by the drive force and each of the drive magnets reaches the position designated by the lens position command signal, the output of each of the actuating circuits goes to 0, and the drive force goes to 0. If the moving frame 14 departs from the position designated by the lens position command signal due to disturbances or the like, a current is again sourced to each of the drive coils, and the moving frame 14 is returned to the position designated by the lens position command signal.

By continuous repetition of the above actions, the image stabilizing lens 16 attached to the moving frame 14 is made to move in accordance with the lens position command signal. The image focused on the film plane F of the camera body 4 is thus stabilized.

In the anti-vibration actuator of the present embodiment of the invention, the first and second drive means are constituted to generate a drive force in essentially the radial direction, therefore the drive force can be increased by expanding the drive means drive coils in the circumferential direction, and a large drive force can be obtained without expanding the outside diameter of the anti-vibration actuator.

Also, in the anti-vibration actuator of the present embodiment, rotational movements generated in conjunction with the translational movement of the moving frame by the second drive means are suppressed by the third drive means, which generates a drive force in essentially the circumferential direction, thus allowing unnecessary rotation of the moving frame to be suppressed.

Furthermore, in the anti-vibration actuator of the present invention, the entire detector section of the first and second magnetic sensors is disposed in the region positioned diagonally opposite the region in which the third drive means is disposed, from among the four regions partitioned by the lines of action of the first drive means drive force and the second drive means drive force, therefore rotational movement of the moving frame around any desired point can be accurately detected by each of the magnetic sensors, and unnecessary rotational movement of the moving frame can be effectively suppressed.

Also, according to the anti-vibration actuator of the present invention, the entire detector section of the first magnetic sensor passes through the center of gravity of the movable portion and is disposed in the region in which the third drive is not disposed, from among the two regions partitioned by a straight line parallel to the line of action of the drive force of the first drive means; the entire detector section of the second magnetic sensor passes through the movable portion center of gravity, and is disposed in a region in which the third drive means is not disposed, from among the two regions partitioned by a straight line parallel to the line of action of the drive force of the second drive means, therefore rotational movement of the moving frame around any point as its center can be accurately detected by each magnetic sensor, and unnecessary rotational movement of the moving frame can be effectively suppressed.

In the anti-vibration actuator of the present invention, the third drive means is provided in order to suppress unnecessary rotational movement of the moving frame, therefore no great drive force is required, and the drive coil and drive magnets that form the third drive means can be reduced in size. This allows the anti-vibration actuator to be further reduced in size.

Furthermore, in the anti-vibration actuator of the present embodiment, the first, second, and third magnetic sensors are disposed inside the first, second, and third drive coils, therefore a position close to the point at which the drive forces of each of the drive means is generated can be detected, and the position of the moving frame can be accurately detected. This allows for accurate control of the anti-vibration actuator.

Note that in the embodiment of the present invention described above, the position of the moving frame 14 was being detected by a magnetic sensor; as a variant, a position can also be detected by position detecting elements other than magnetic sensors.

Figure 9:
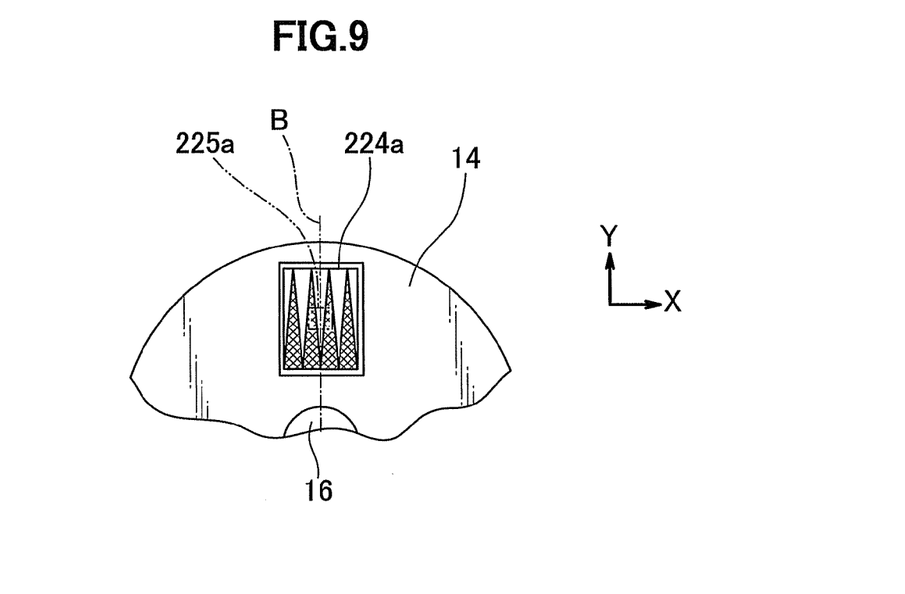
FIG. 9 Diagram showing a reflection pattern appended to a moving frame in a variation embodiment of the present invention.
Figure 10:
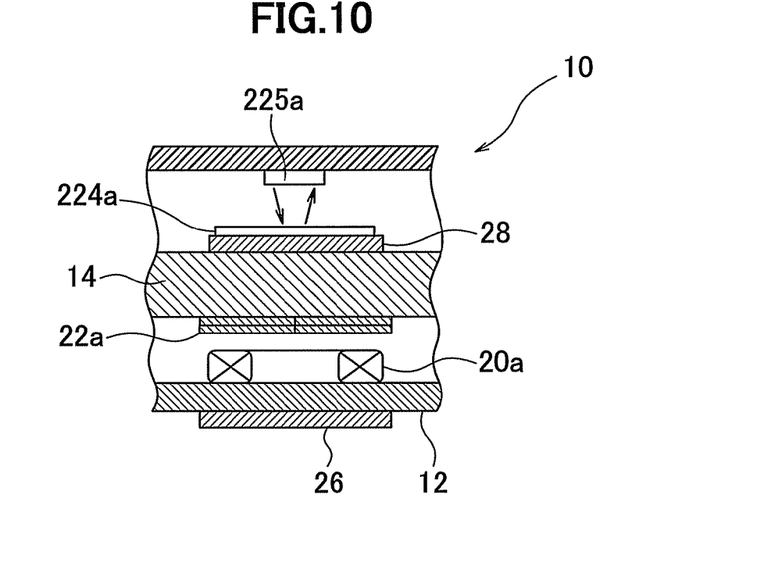
FIG. 10 Diagram showing the illumination and detection of light by a reflection sensor in a variation embodiment of the present embodiment.

FIGS. 9 and 10 depict a variant of embodiments of the present invention. In this variant, the position of the moving frame 14 is detected by a reflection pattern and a reflection sensor which together serve as a position detection element. FIG. 9 shows the reflection pattern attached to the moving frame; FIG. 10 shows light illumination and detection by the reflection sensor.

As shown in FIG. 9, a reflection pattern 244a, which is a reflecting plate, is rectangular; a centerline bisecting its short sides is disposed to overlap the magnetization boundary line C of the drive magnet 22a. A sawtooth pattern is inscribed in the reflecting pattern 224a; the reflective portion thereof, shown as white in the diagram, reflects light, whereas the non-reflective portion, shown as black in the diagram, does not reflect light. At the same time, as shown in FIG. 10, a reflection sensor 225a is disposed on the opposite side of the fixed plate facing the reflection pattern 224a; light is reflected in the reflection pattern 224a, and reflected light from the reflection pattern 224a is received. The reflection sensor 225a sends an output signal to the controller 36 in response to the intensity of the light received.

Here, if the reflection pattern 224a is moved upward in FIG. 9 relative to the reflection sensor 225a, most of the light illuminated from the reflection sensor 225 falls on the non-reflective portion of the reflection pattern 224a, and light reflected from the reflection pattern 224a is diminished. Conversely, when the reflection pattern 224a is moved downward, the proportion of illuminated light hitting the reflecting portion of the reflection pattern 224a increases, and the light reflected from the reflection pattern 124a intensifies. The position of the reflection pattern 224a relative to the reflection sensor 225a can thus be detected by the relative strength of the light received by the reflection sensor 225a.

Conversely, when the reflection pattern 224a moves in the left or right direction in FIG. 9 relative to the reflection sensor 225a, there is almost no change in the ratio of reflecting and non-reflecting portions within the region hit by light illuminated from the reflection sensor 225a, therefore the intensity of the light reflected from the reflection pattern 224a does not change. In other words, the system is constituted so that when the reflection pattern 224a is moved in the Y axis direction—which is the direction of its detection axis B—the reflection sensor 225a detection signal changes, but when it is moved in the X axis direction perpendicular to the detection axis B, the reflection sensor 225a detection signal does not change.

Reflection patterns and reflection sensors (not shown) corresponding to the second and third drive magnets are also provided. The reflection sensor corresponding to the second drive magnet detects movement of the moving frame 14 in the X axis direction, while the reflection sensor corresponding to the third drive magnet detects movement in the direction of a circle centered on the optical axis of the moving frame 14.

Although in the present variation reflection patterns and reflection sensors were placed in positions corresponding to each of the drive magnets, the reflection patterns and reflection sensors can also be placed in different positions.

According to the present variation, each position detection element can be placed independent of the positions of each of the drive magnets.

We have explained preferred embodiments of the present invention above, but various changes can be added to the embodiments described above. In particular, in the embodiment described above the present invention was applied to a film camera, but the present invention can also be applied to a digital still camera, a video camera, or the like. Also, in the embodiment described above the drive coil was attached to the fixed portion and the drive magnet was attached to the movable portion, but the drive coil can also be attached to the movable portion and the drive magnet to the fixed portion.

EXPLANATION OF REFERENCE NUMERALS

1 Camera according to an embodiment of the present embodiment.
2 Lens unit
4 Camera body
6 Lens barrel
8 Photographic lens
10 Anti-vibration actuator
12 Fixed plate (fixed portion)
14 Moving plate (movable portion)
16 Image stabilizing lens
18 Steel balls (movable portion support means)
20a First drive coil
20b Second drive coil
20c Third drive coil
22a First drive magnet
22b Second drive magnet
22c Third drive magnet
24a First magnetic sensor (first position detection element)
24b Second magnetic sensor (second position detection element)
24c Third magnetic sensor (third position detection element)
26 Pull-in yoke
28 Back yoke
30 Indentation
34a, 34b Gyros
36 Controller
38a, 38b Computation circuits
40 Computation circuit
42a, 42b, 42c Magnetic sensor amps
44a, 44b, 44c Operation circuits
110 Actuator
112 Fixed portion
114 Movable portion
118 Steel balls
120 Drive coil
122 Drive magnet
124 Hall element
224a Reflection pattern
225a Reflection sensor

The invention claimed is:

1. An anti-vibration actuator for moving an image stabilizing lens within a plane perpendicular to the optical axis thereof, comprising:
 a fixed portion;
 a movable portion to which the image stabilizing lens is attached;
 movable portion support means for supporting the movable portion to allow for translational and rotational movement within a plane parallel to the fixed portion;
 first drive means including a first drive magnet and a first drive coil disposed in opposition thereto, oriented in such a way that the line of action of the drive force driving the movable portion relative to the fixed portion is directed in essentially the radial direction of the image stabilizing lens;

second drive means including with a second drive magnet and a second drive coil disposed in opposition thereto, oriented in such a way that the line of action of the drive force driving the movable portion relative to the fixed portion is essentially perpendicular to the line of action of the drive force of the first drive means and is oriented in essentially the radial direction of the image stabilizing lens;

third drive means including with a third drive magnet and a third drive coil disposed in opposition thereto, oriented so that the line of action of the drive force driving the movable portion with respect to the fixed portion is directed in essentially the circumferential direction of the image stabilizing lens;

first, second, and third position detection elements for detecting the respective positions of the movable portion relative to the fixed portion in a direction parallel to the line of action of each of the drive forces of the first, second, and third drive means; and a control section for controlling current supplied to the first, second, and third drive coils based on the positions detected by the first, second, and third position detecting elements, so as to move the movable portion to a specified position;

wherein a straight line passing through the center of gravity of the movable portion, and parallel to the line of action of the drive force from the first drive means defines first and second regions, and the third drive means is disposed in the first region and the first position detection element is disposed such that its entire detector section is positioned in the second region; and wherein a straight line passing through the center of gravity of the movable portion, and parallel to the line of action of the drive force from the second drive means defines third and fourth regions, and the third drive means is disposed in the third region and the second detection element is disposed such that its entire detector section is positioned in the fourth region.

2. The anti-vibration actuator according to claim 1 in which the first, second, and third position detection elements are disposed in opposition to the first, second, and third drive magnets, and detect the positions of each of the drive magnets.

3. The anti-vibration actuator according to claim 1, wherein the drive force which can be generated by the third drive means is smaller than the drive force which can be generated by the first and second drive means.

4. The anti-vibration actuator according to claim 1, wherein the first, second, and third position detection elements are Hall elements.

5. The anti-vibration actuator according to claim 1 in which the first, second, and third position detection elements are disposed on the inside of the first, second, and third drive coils.

6. A lens unit comprising:
a lens barrel;
an imaging lens disposed within the lens barrel; and
an anti-vibration actuator according to claim 1 attached to the lens barrel.

7. A camera comprising:
the lens unit according to claim 6; and
a camera body to which this lens unit is attached.

8. An anti-vibration actuator for moving an image stabilizing lens within a plane perpendicular to the optical axis thereof, comprising:
a fixed portion;
a movable portion to which the image stabilizing lens is attached;
movable portion support means for supporting the movable portion to allow for translational and rotational movement within a plane parallel to the fixed portion;

first drive means including a first drive magnet and a first drive coil disposed in opposition thereto, oriented in such a way that the line of action of the drive force driving the movable portion relative to the fixed portion is directed in essentially the radial direction of the image stabilizing lens;

second drive means including with a second drive magnet and a second drive coil disposed in opposition thereto, oriented in such a way that the line of action of the drive force driving the movable portion relative to the fixed portion is essentially perpendicular to the line of action of the drive force of the first drive means and is oriented in essentially the radial direction of the image stabilizing lens;

third drive means including a third drive magnet and a third drive coil disposed in opposition thereto, oriented so that the line of action of the drive force driving the movable portion with respect to the fixed portion is directed in essentially the circumferential direction of the image stabilizing lens;

first, second, and third position detection elements for detecting the respective positions of the movable portion relative to the fixed portion in a direction parallel to the line of action of each of the drive forces of the first, second, and third drive means; and a control section for controlling current supplied to the first, second, and third drive coils based on the positions detected by the first, second, and third position detecting elements, to move the movable portion to a specified position;

wherein the drive force lines of action from the first drive means and the second drive means define four regions, the third drive means is disposed in one of the four regions, and the first and second position detection elements are disposed such that the entire detector sections thereof are within a region positioned in diagonal opposition to the region in which the third drive means is disposed.

9. The anti-vibration actuator according to claim 8 in which the first, second, and third position detection elements are disposed in opposition to the first, second, and third drive magnets, and detect the positions of each of the drive magnets.

10. The anti-vibration actuator according to claim 8, wherein the drive force which can be generated by the third drive means is smaller than the drive force which can be generated by the first and second drive means.

11. The anti-vibration actuator according to claim 8, wherein the first, second, and third position detection elements are Hall elements.

12. The anti-vibration actuator according to claim 8 in which the first, second, and third position detection elements are disposed on the inside of the first, second, and third drive coils.

13. A lens unit comprising:
a lens barrel;
an imaging lens disposed within the lens barrel; and
an anti-vibration actuator according to claim 8 attached to the lens barrel.

14. A camera comprising:
the lens unit according to claim 13; and
a camera body to which this lens unit is attached.

* * * * *